United States Patent [19]

Rees

[11] 4,210,229

[45] Jul. 1, 1980

[54] DISC BRAKE ASSEMBLIES

[75] Inventor: John R. Rees, Halesowen, England

[73] Assignee: Girling Limited, Birmingham, England

[21] Appl. No.: 800,887

[22] Filed: May 26, 1977

[30] Foreign Application Priority Data

May 26, 1976 [GB] United Kingdom ............... 21757/76
Dec. 11, 1976 [GB] United Kingdom ............... 51787/76

[51] Int. Cl.² .................... B60T 1/06; F16D 55/02; F16D 55/14
[52] U.S. Cl. .................. 188/18 A; 74/710.5; 74/781 R; 188/71.1; 188/71.4
[58] Field of Search .............. 188/71.1, 71.4, 18 A, 188/18 R; 74/781 R, 710.5

[56] References Cited

U.S. PATENT DOCUMENTS

| 1,861,482 | 6/1932 | Sifton | 74/781 R |
|---|---|---|---|
| 2,201,165 | 5/1940 | Friedrich et al. | 188/153 R |
| 2,241,087 | 5/1941 | Griswold | 74/781 R |
| 2,683,997 | 7/1954 | Forster | 74/781 R |
| 3,164,036 | 1/1965 | Lamburn et al. | 74/781 R |
| 3,550,711 | 12/1970 | Tapp | 74/710.5 X |
| 3,583,529 | 6/1971 | Robinson | 188/71.4 |
| 3,690,426 | 9/1972 | Weisgerber | 74/710.5 X |
| 3,814,222 | 6/1974 | Koivunen | 74/710.5 X |
| 3,820,638 | 6/1974 | Ebey | 188/18 R X |
| 3,956,945 | 5/1976 | Eggleton et al. | 74/710.5 |
| 3,978,742 | 9/1976 | Abbott | 74/781 R X |

FOREIGN PATENT DOCUMENTS 130302 2/1929 Switzerland ........................ 188/18 R Primary Examiner—George E. A. Halvosa
Attorney, Agent, or Firm—Scrivener, Parker, Scrivener and Clarke

[57] ABSTRACT

A disc brake assembly includes one or more rotatable friction discs which are slidably keyed to a second portion of a two part shaft assembly and the second portion surrounds and is rotatable relative to the first portion which transmits drive directly to a wheel and drives the second portion through a reduction gear train so that the second portion can rotate at a greater speed than the first.

11 Claims, 4 Drawing Figures

DISC BRAKE ASSEMBLIES

SPECIFIC DESCRIPTION

This invention relates to improvements in disc brake assemblies of the kind in which one or more rotatable friction disc provided with friction linings and slidably keyed to a shaft assembly within a stationary housing are adapted to be moved axially into frictional engagement with a relatively stationary surface by actuating means.

Brake assemblies of that kind are commonly used on tractors and like vehicles and are hereinafter called brakes of the kind set forth. Such brakes may be "dry" or may be of the "oil-immersed" type in which the housing is filled with cooling oil. The actuating means may comprise an hydraulic annular piston located in an annular recess in an end wall of the housing, or a plurality of individual, angularly spaced pistons working in individual bores in the end wall of the housing and acting on the disc through an annular pressure plate. Where at least two axially spaced discs are slidably keyed on the shaft assembly the actuating means may comprise an expander mechanism located between the discs.

In a tractor or like vehicle there may be a direct drive between the differential unit and each rear wheel but, in such a case, due to the relatively high brake torque requirements at the wheel, particularly when steering assistance is to be provided, the additional requirements of performance stability, thermal capacity, minimum size and sealing of the mechanism from the external environment are not easily reconciled.

When the brake assemblies are incorporated in a rear axle of a tractor or like vehicle between the differential unit and the rear wheels it is known to provide a reduction gear set, suitably epicyclic, between each brake and the wheel on that side of the vehicle. The reduction gearing magnifies the braking torque and enables brakes of the kind set forth, which are of the low torque type, to be utilised satisfactorily. In such installations however, the reduction gearing also magnifies the driving torque which, in turn affects the differential unit and gearbox gear ratios.

According to our invention in a disc brake assembly of the kind set forth the shaft assembly comprises a first shaft portion for transmitting a drive directly from a differential unit to a wheel, and a second shaft portion surrounding and rotatable relative to the first and to which the or each rotatable friction disc is slidably keyed, the second shaft portion being driven from the first through a reduction gear train whereby the second shaft portion can rotate at a greater speed than the first.

This has the advantage that when the brake is incorporated in a back axle of a tractor or like vehicle between the differential unit and a wheel only the braking torque is magnified and the driving torque is unaffected.

Thus brakes in accordance with our invention can be fitted to axles which do not contain individual reduction units associated with each wheel.

The reduction gear train may comprise a simple gear train or it may comprise an epicyclic. In the former case the second shaft portion comprises the inner gear and in the latter case the sun gear.

Some embodiments of our invention are illustrated in the accompanying drawings in which.

Figure 1:
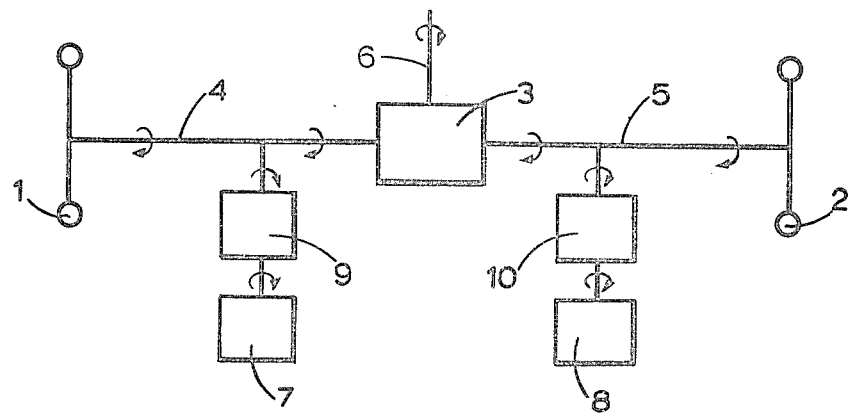
FIG. 1 is a schematic layout of a back-axle arrangement for a tractor or like vehicle.

In the layout of FIG. 1 rear wheels 1 and 2 on opposite sides of a tractor or like vehicle are driven from a differential unit 3 through half-shafts 4 and 5, and the differential unit receives an input from a pinnion shaft 6. Brakes 7 and 8 are driven from the half-shafts 4 and 5 through reduction gear trains 9 and 10 which are incorporated in the brakes 7 and 8.

Figure 2:
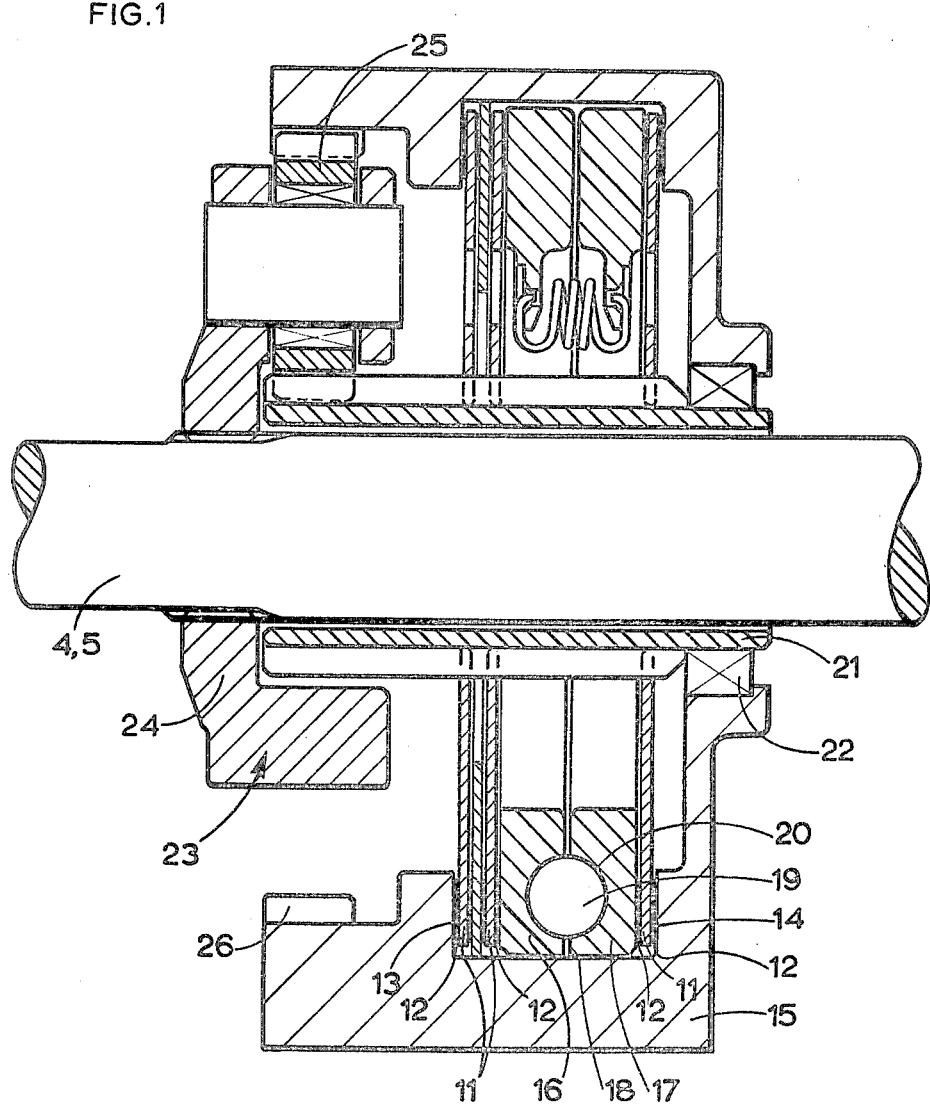
FIG. 2 is a longitudinal section through a self-energising disc brake assembly showing a part of a back-axle.

Each brake 7, 8 comprises a self-energising disc brake illustrated in FIG. 2. In the disc brake of FIG. 2, friction discs 11 provided with friction linings 12 are adapted to be brought into engagement with spaced opposed radial surfaces 13, 14 in a relatively stationary housing 15 by pressure plates 16, 17 located between an adjacent pair of discs 11 and centred by stationary pilot lugs 18. Balls or rollers 19 are located in co-operating oppositely inclined recesses 20 in adjacent faces of the pressure plates 16, 17.

The application of the brake is initiated by moving the pressure plates 16, 17 angularly in opposite directions, the pressure plates 16, 17 then moving apart into engagement with the friction discs which are urged into engagement with the surfaces 13 and 14. The pressure plates 16 and 17 are then carried round with the friction disc 11 until one is arrested by the engagement of a lug on that plate with a drag-taking stop abutment (not shown) in the housing 15. The continued angular movement of the other pressure plate provides a servo-action.

The half shaft 4, 5 projects through the housing 15 and through a sleeve 21 which is located in the housing 15 and is journalled for rotation at one end on a bearing 22 housed in the end wall of the housing 15 of which the inner face defines the radial surface 14. The sleeve 21 is provided with teeth whose base diameter is no less than the diameter of the surface of the sleeve 21 engaging with the bearing 22. The sleeve 21 thus forms the sun gear of an epicyclic gear train 23 of which the carrier member 24 is splined to the shaft 4, 5 and each of three planet spur gears 25 are rotatably mounted on the carrier member 24 and mesh between the sun gear 21 and an annulus 26 on the radial wall of the housing 15.

The friction discs 11 are slidably keyed to the sun gear 21 by a toothed aperture slidably receiving the teeth on the sun gear 21 so that the sun gear 21 forms with the half shaft 4, 5 a shaft assembly from which the discs 11 are driven.

When the half-shaft 4, 5 is rotating, due to the provision of the gear train 23 the friction discs 11 are rotated at a relatively greater speed than the half-shaft. This means that the braking torque is magnified to increase the brake effectiveness so that the choice of brake types is increased. For example, the brake described above may be of the oil immersed type.

Figure 3:
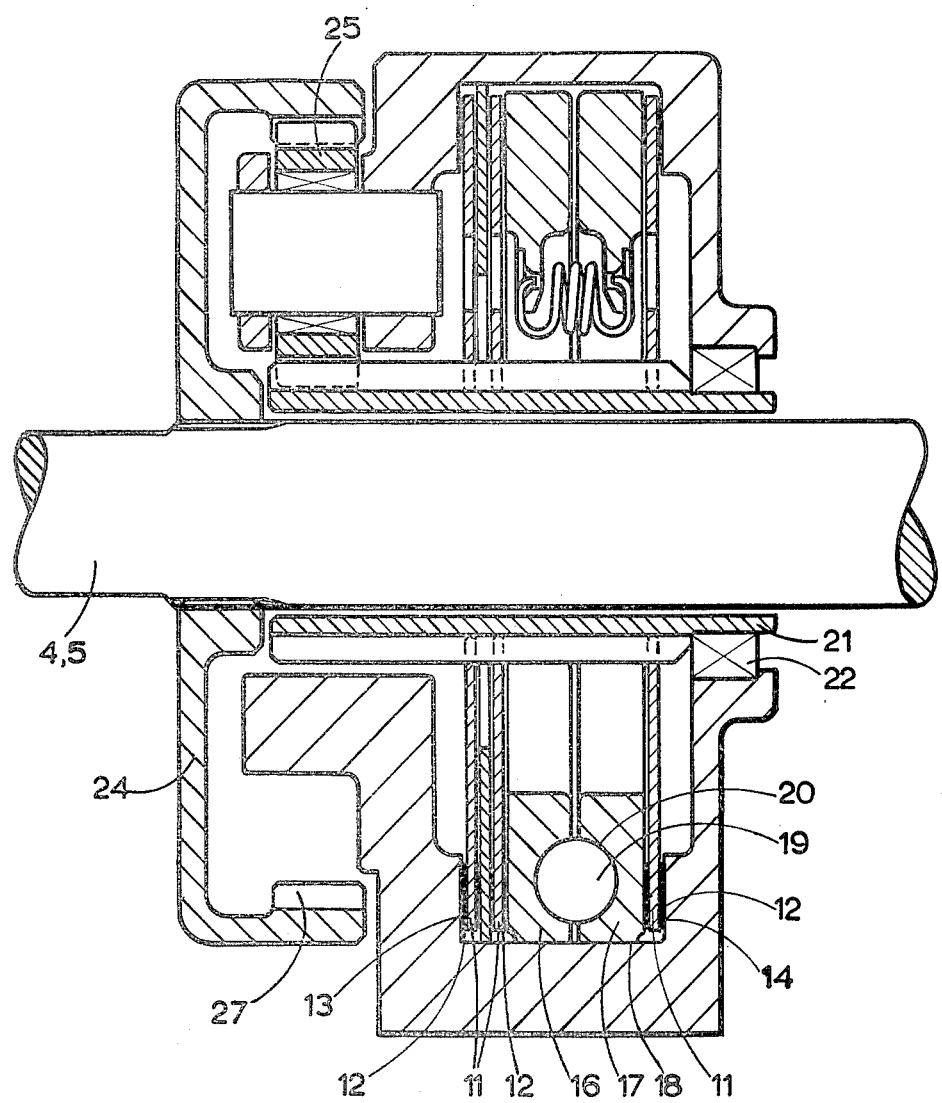
FIG. 3 is a longitudinal section similar to FIG. 2 but showing a modification.

In the disc brake of FIG. 3 the spur gears 25 are rotatably mounted on the housing 15 itself and mesh between the gear 21 and an annulus 27 on the member 24 which is extended radially. Thus the gear 21 on which the friction discs 11 are mounted is driven through a simple gear train at a relatively greater speed than the shaft 4, 5.

The construction and operation of the brake of FIG. 3 is otherwise the same as that of FIG. 2 and corresponding reference numerals have been applied to corresponding parts.

Figure 4:
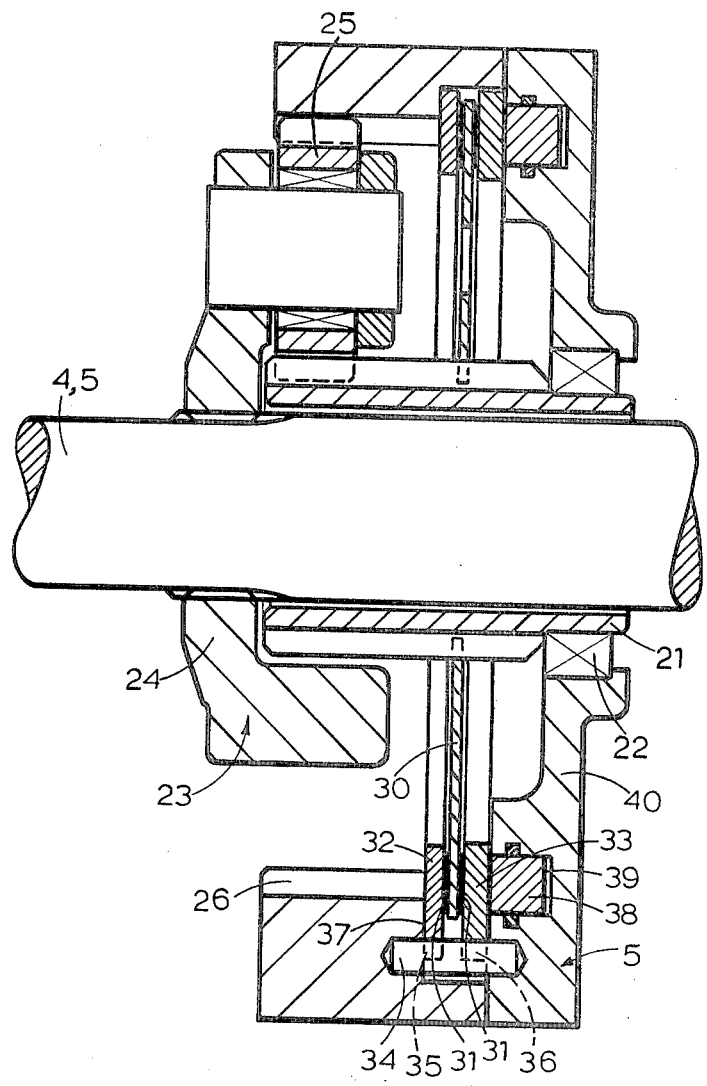
FIG. 4 is a longitudinal section through a brake assembly similar to FIG. 2 but showing a modification.

In the disc brake illustrated in FIG. 4 a single disc 30 provided on opposite sides with friction linings 31 is slidably keyed to the sleeve which comprises the sun gear 21, and the disc 30 is disposed between a pair of axially spaced rings 32 and 33 which are held against rotation by three axially extending angularly spaced drag-taking pins 34 fixed in the housing and received in notches 35, 36 in the peripheral edges of the rings 32, 33 respectively. The ring 32 is in abutment with radial face 37 on one end wall of the housing 15 and constitutes a stationary surface for engagement by the disc when the brake is applied, and the other ring 33 comprises a pressure plate which acts on the opposite face of the disc and is movable on the pins 34 in an axial direction.

The pressure plate 33 is moved axially in the housing 15 to urge the disc 30 into frictional engagement with the ring 32 by means of an hydraulic annular piston 38 located on annular recess 39 in the opposite end wall 40 at the housing 15 when the hydraulic fluid under pressure is supplied to the recess 39. When the brake is applied the drag on the rings 32 and 33 is transmitted to the housing 15 through the pins 34.

The construction and operation of the brake of FIG. 4 is otherwise the same as that of FIG. 2 and corresponding reference numerals have been applied to corresponding parts.

In a modification more than one friction disc 30 may be slidably keyed to the sleeve as in FIG. 4.

In a further modification the annular piston 38 may be replaced by a plurality of separate, angularly spaced pistons working in individual hydraulic cylinder bores in the end wall 40, and the cylinders are pressurised simultaneously to apply the brake.

In the brake described above with reference to FIG. 4 the spur gears 25 can be rotatably mounted on the housing 15 itself and mesh between the gear 21 and an annulus on the member 24 which is extended radially, as described above with reference to the embodiment of FIG. 3.

I claim:

1. A disc brake assembly comprising a stationary housing, a stationary surface in said housing, a shaft assembly having a first shaft portion and a second shaft portion surrounding and rotatable relative to said first shaft portion, said second shaft portion being rotatable in response to rotation of said first shaft portion, at least one rotatable friction disc having friction linings and slidably keyed to said second shaft portion, actuating means for moving said friction disc axially into frictional engagement with said stationary surface to brake said shaft assembly to slow or stop the same, said first shaft portion comprising means for transmitting a driving torque directly from a differential unit to a wheel, and a reduction gear train through which said second shaft portion is driven by said first shaft portion without magnifying said driving torque and comprising means whereby said second shaft portion will rotate at a greater speed than said first shaft portion is, and when the brake is applied, said first shaft portion is braked proportionately in response to braking of said second shaft portion to brake said shaft assembly.

2. A disc brake assembly as claimed in claim 1, wherein said second shaft portion comprises an inner gear of a simple gear train.

3. A disc brake assembly as claimed in claim 1, wherein said reduction gear train comprises an epicyclic gear train having a sun gear with teeth and said second shaft portion comprises said sun gear.

4. A disc brake assembly as claimed in claim 3, wherein a carrier member forming part of said gear train is splined to said first shaft portion.

5. A disc brake assembly as claimed in claim 4, wherein a plurality of planet spur gears forming part of said gear train are rotatably mounted on said carrier member, said housing having an annulus, and said spur gears mesh between said sun gear and said annulus.

6. A disc brake assembly as claimed in claim 4, wherein a plurality of planet spur gears forming part of said gear train are rotatably mounted on said housing and said carrier member has a radial extension on which an annulus is formed, said spur gears meshing between said sun gear and said annulus.

7. A disc brake assembly as claimed in claim 3 wherein said at least one friction disc has a toothed aperture which slidably receives said teeth on said sun gear.

8. A disc brake assembly as claimed in claim 1, wherein a single friction disc is keyed to said second shaft portion and said housing is provided with a bore in an end wall, said actuating means comprising at least one hydraulic piston working in said bore.

9. A disc brake assembly as claimed in claim 1, wherein two axially spaced discs are slidably keyed to said second shaft portion and said actuating means comprises an expander mechanism located between said discs.

10. A disc brake assembly comprising a stationary housing, a stationary surface in said housing, a shaft assembly having a first shaft portion and a second shaft portion, said second shaft portion comprising a sleeve surrounding and rotatable relative to said first shaft portion and being rotatable in response to rotation of said first shaft portion, at least one rotatable friction disc having friction linings and slidably keyed to said second shaft portion by means of teeth provided on said second shaft portion, actuating means for moving said friction disc axially into frictional engagement with said stationary surface to brake said shaft assembly, said first shaft portion comprising means for transmitting a drive directly from a differential unit to a wheel, and a reduction gear train through which said second shaft portion is driven by said first shaft portion by means of the same teeth which key said disc on said second shaft portion and comprising means whereby said second shaft portion will rotate at a greater speed than said first shaft portion and when the brake is applied, said first shaft portion is braked proportionately in response to braking of said second shaft portion to brake said shaft assembly.

11. A disc brake assembly as claimed in claim 10, wherein a bearing for said sleeve is provided, and a surface on said sleeve for engagement with said bearing is of a diameter no greater than the base diameter of said teeth on said sleeve.

* * * * *